United States Patent
Kraai

(10) Patent No.: US 9,550,398 B2
(45) Date of Patent: Jan. 24, 2017

(54) FIFTH WHEEL LATCHING ASSEMBLY

(71) Applicant: Dethmers Manufacturing Company, Boyden, IA (US)

(72) Inventor: Jason J. Kraai, Hull, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 0 days.

(21) Appl. No.: 14/049,613

(22) Filed: Oct. 9, 2013

(65) Prior Publication Data

US 2015/0097355 A1    Apr. 9, 2015

(51) Int. Cl.
 *B60D 1/01* (2006.01)
 *B60D 1/28* (2006.01)

(52) U.S. Cl.
 CPC .............. *B60D 1/015* (2013.01); *B60D 1/28* (2013.01)

(58) Field of Classification Search
 CPC ............................. B60D 1/015; B62D 53/12
 USPC ............. 280/432, 433, 434, 435, 436, 437, 438.1, 280/508, 510
 See application file for complete search history.

(56) References Cited

U.S. PATENT DOCUMENTS

| | | | |
|---|---|---|---|
| 2,411,404 A * | 11/1946 | Winn | 280/432 |
| 4,792,151 A | 12/1988 | Feld | |
| 5,257,796 A * | 11/1993 | Thorwall et al. | 280/434 |
| 5,641,174 A | 6/1997 | Terry et al. | |
| 5,839,745 A | 11/1998 | Cattau et al. | |
| 6,908,093 B1 * | 6/2005 | Putnam | 280/435 |
| 6,935,650 B2 | 8/2005 | Grinde et al. | |
| 7,543,837 B2 | 6/2009 | Crawley | |
| 7,896,383 B2 | 3/2011 | Cockram et al. | |
| 8,132,825 B1 | 3/2012 | Choquette et al. | |
| 8,191,914 B2 | 6/2012 | Wulff | |
| 8,210,558 B2 | 7/2012 | Mann et al. | |
| 2003/0015855 A1 | 1/2003 | McCoy et al. | |
| 2012/0018978 A1 | 1/2012 | McCoy et al. | |

OTHER PUBLICATIONS

Reese R20 5th Wheel Trailer Hitch—Serrated Dual Jaw—20,000 lbs, www.etrailer.com/Fifth-Wheel/Reese/RP30867.html.

* cited by examiner

*Primary Examiner* — Tony Winner
*Assistant Examiner* — Felicia L Brittman
(74) *Attorney, Agent, or Firm* — Brick Gentry PC; Brian J. Laurenzo; Jessica L. Susie

(57) ABSTRACT

A fifth wheel latching assembly is provided having first and second locking assemblies. The first locking assembly includes first and second jaw members, which are movable between open and locked configurations. In the locked configurations, at least one of the first and second jaw members locks a kingpin in place for towing. The second locking assembly includes a latch element which is movable between open and locked positions. In its closed position, the latch element locks a kingpin in place for towing. The first and second locking assemblies independently lock the kingpin in place. Kingpin insertion causes automatic locking of the first and second locking assemblies.

19 Claims, 7 Drawing Sheets

FIFTH WHEEL LATCHING ASSEMBLY

FIELD OF THE INVENTION

The present invention relates generally to coupling mechanisms for attaching a trailer to a towing vehicle. More specifically, the present invention relates to a fifth wheel latching assembly for coupling a fifth wheel trailer to a towing vehicle.

BACKGROUND

Fifth wheel hitch mechanisms are commonly used to couple a towed trailer or recreational vehicle to a towing vehicle. A towing vehicle may include, but is not limited to, a semi-tractor, tow truck, or pickup truck. Generally, the towing vehicle will include a latching assembly, also called a fifth wheel hitch. For example, in the case of a pickup truck, a latching assembly is attached to the floor of the truck bed. The item to be towed includes a kingpin, which the latching assembly engages. In some cases, this arrangement is reversed with the kingpin attached to the towing vehicle and the latching assembly or hitch attached to the item to be towed. Accordingly, the latching assembly captures and locks the kingpin in place in order to pull the towed vehicle.

A dangerous situation occurs when a towed item uncouples from a towing vehicle during use. However, fifth wheel latching assemblies of the prior art do not provide secondary locking mechanisms to prevent decoupling of the kingpin in the event that the hitch assembly fails. U.S. Pat. Nos. 7,896,363 to Cockram et al. and 5,839,745 to Cattau et al. disclose fifth wheel hitch devices with single jaw members to hold a kingpin in place. In these devices, should the jaw members fail, decoupling will occur. In other previous fifth wheel latching assemblies, such as those described in U.S. Pat. Nos. 7,543,837 to Crawley and 6,935,650 to Grinde et al., two jaw members are employed to lock a kingpin in place. However, these devices do not include a second locking means to prevent decoupling in the event that the two jaw members separate.

In another example, U.S. Pat. No. 8,132,825 to Choquette et al. discloses a fifth wheel hitch including two opposing jaw pieces, a tumbler, and a latch. The two opposing jaw pieces are biased in an open, unlocked position by a spring. The tumbler is the only locking mechanism and, in the locked position, holds the jaw pieces closed. Should the tumbler fail, the jaw pieces will be pulled to their open positions by the spring, thus allowing decoupling of the hitch and kingpin.

U.S. Pat. No. 8,210,558 to Mann et al. discloses a fifth wheel hitch having a secondary lock assembly. However the Mann et al. secondary lock assembly does not solve the problem of preventing kingpin decoupling in the event that the primary lock assembly fails. Specifically, the Mann et al. assembly includes a jaw member which captures the kingpin. A locking wedge holds the jaw member in place to lock the kingpin for towing. When the wedge member is not in place, the jaw member is held open by a spring. The wedge is connected to a tie bar, which is in turn connected to a pull bar located near the front (towards the towing vehicle) of the fifth wheel hitch. A locking mechanism is present to lock the pull bar, and accordingly the tie bar and wedge, in the locked position. However, should the wedge, tie bar, or pull bar fail, the locking mechanism will not prevent decoupling of the kingpin by the hitch. Moreover, the secondary locking mechanism disclosed in Mann et al. must be manually activated by the user.

In another example, U.S. Pat. No. 5,257,796 to Thorwall et al., which discloses an integrated cam lever and handle lock fifth wheel, locking of a single locking mechanism is automatic upon kingpin insertion. The Thorwall et al. device discloses a single jaw, cam arm, locking plunger, release arm, and release handle. In the locked position, the locking plunger engages the single jaw and is held in place by the positions of the cam arm, release arm, and release handle. However, the single jaw requires engagement with the plunger to lock the kingpin in place. Therefore, failure of the plunger or locking mechanism will cause decoupling of the kingpin by the jaw element.

Accordingly, there is a need in the art for a fifth wheel latching assembly that provides two locking mechanisms which both independently prevent uncoupling of a kingpin from the latching assembly. Moreover, there is a need in the art for a fifth wheel latching assembly wherein two locking assemblies are automatically locked upon insertion of a kingpin without manual activation by the user. The fifth wheel latching assembly should include few moving parts and allow for quick coupling and decoupling of the latching assembly and kingpin.

SUMMARY

Accordingly, a fifth wheel latching assembly is provided which improves on the prior art. The fifth wheel latching assembly of the present invention includes first and second locking assemblies, which may each independently prevent decoupling of the kingpin. Therefore, should the first locking assembly fail, the second locking assembly will lock the kingpin securely in place for towing. Conversely, should the second locking assembly fail, the first locking assembly will lock the kingpin securely in place for towing. Moreover, both the first and second locking assemblies are automatically locked upon insertion of a kingpin. Fifth wheel latching assemblies of the present invention provide quick coupling and decoupling of a latching assembly and kingpin.

In a first embodiment of the invention, a fifth wheel latching assembly is provided. The assembly includes first and second locking assemblies, with the first locking assembly having open and locked configurations. The first locking assembly includes first and second jaw members and a first biasing member which biases at least one of the first and second jaw members in the locked configuration. Moreover, in the locked configuration, at least one of the first and second jaw members locks a kingpin in place. The second locking assembly includes a latch bar and a biasing member. The biasing member biases the latch bar in a locked position to lock the kingpin in place. The latch bar may be actuated to move to an open position. The first and second locking assemblies independently lock the kingpin in place.

In another embodiment, a fifth wheel latching assembly having a first locking assembly, a second locking assembly, and a link is disclosed. The first locking assembly includes a first jaw member with a concave surface forming an inlet. The inlet is configured to at least partially encircle a kingpin. The first locking assembly further includes a second jaw member. The first and second jaw members are movable between open and locked configurations. The first jaw member may lock the kingpin in the inlet in the locked configuration. The first locking assembly also includes a first biasing member which biases the second jaw member in its open configuration.

The second locking assembly includes a latch bar which is movable between open and locked positions and a second biasing member which biases the latch bar in the locked position. The fifth wheel latching assembly also includes a link connecting the latch bar and the first locking assembly. Actuation of the latch bar to the open position actuates the first locking assembly to move to its open configuration. Additionally, insertion of the kingpin actuates the first locking assembly to move to its locked configuration and the latch bar to move to its locked position.

In yet another embodiment, a fifth wheel latching assembly is provided. The assembly includes an arcuate first jaw member that is movable between locked and open configurations including a first end, an engagement portion near the first end, a second end, a concave surface between the first and second ends forming an inlet, a first jaw member link pin, and a catch near the first end. The first jaw member is rotatable about a first pivot pin. The assembly further includes a second jaw member movable between locked and open configurations including a first end, a second end, a catching portion near the first end, an abutting surface near the first end, and an angled portion near the second end. The second jaw member is rotatable about a second pivot pin. The assembly also includes a first biasing member to bias the second jaw member in its locked configuration. The assembly additionally includes a latch bar which is movable between open and locked positions comprising a first end, second end, handle connected to the first end, and latch bar link pin near the second end. A second biasing member biases the latch bar in the locked position. The assembly further includes a link connected to the first jaw member link pin and latch bar link pin.

Actuation of the handle moves the latch bar to its open position, which actuates the link to move the first jaw member to its open configuration. This movement further actuates the first jaw member engagement portion to cam against the second jaw member abutting surface, causing the second jaw member catching portion to engage the first jaw member catch. The engagement of the first jaw member catch by the second jaw member catching portion holds the first and second jaw members in their open positions. Moreover, insertion of a kingpin causes the kingpin to bear against the angled portion of the second jaw member. This causes the second jaw member catching portion to release the first jaw member catch, which actuates the first jaw member to move to its locked configuration and the latch bar to move to its locked position. In its locked configuration, the first jaw member receives the kingpin in the inlet. Accordingly, the first jaw member locks the kingpin in the fifth wheel latching assembly and the latch bar independently locks the kingpin in the fifth wheel latching assembly, also.

DETAILED DESCRIPTION

The following is a detailed description of an embodiment of a fifth wheel latching assembly 100 (sometimes "assembly" or "latching assembly"). The latching assembly 100 is adapted to couple a towing vehicle to a towed item. Exemplary uses of such a latching assembly 100 include, but are not limited to, coupling a recreational vehicle to a pickup truck and a semi-trailer to a semi-tractor. However, a latching assembly 100 of the present invention may be used in any fifth wheel coupling, such as those having a kingpin that is received by a fifth wheel hitch or latching assembly. In the described embodiment, the latching assembly is attached to the towing vehicle, while the kingpin is attached to the towed item. Further, the directions "forward", "front" and similar terms refer to the direction of the front of the towing vehicle from the latching assembly. In addition, "behind", "back" and similar terms refer to the direction of the rear of the towed item from the latching apparatus. Accordingly, the towing vehicle is generally to the front of the assembly 100, while the towed item is generally behind the assembly 100. It will be appreciated that the kingpin and assembly 100 may be reversed such that a towing vehicle includes a kingpin which is received by a latching assembly 100 of a towed item without departing from the scope of the invention.

Figure 1:
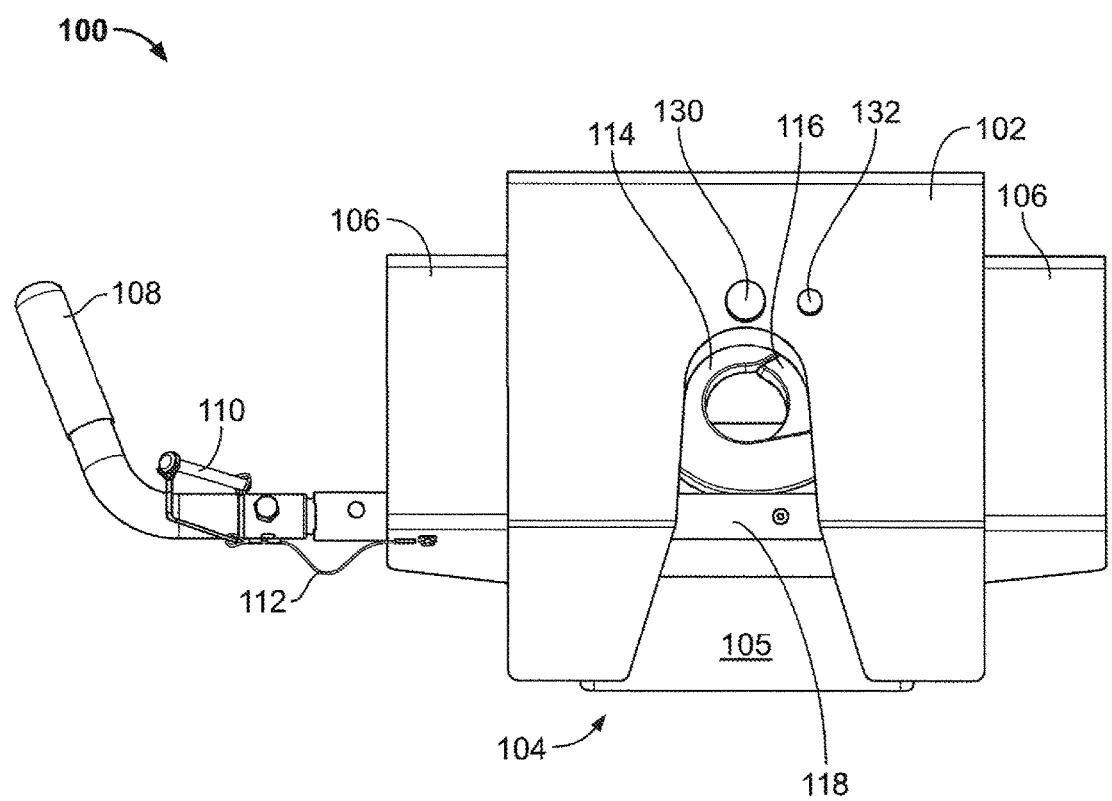
FIG. 1 is a perspective view according to one embodiment of a fifth wheel latching assembly of the present invention.

Referring to FIG. 1, a fifth wheel latching assembly 100 according to one exemplary embodiment of the present invention is shown. In the exemplary embodiment of FIG. 1, the assembly 100 includes a guide plate 102 for guiding a kingpin into the assembly 100. Also present is a head portion 106, which is located underneath and extends beyond the sides of the guide plate 102. A throat area 104 cuts into the guide plate 102 and head portion 106 to assist in guiding the kingpin into the assembly 100. The head portion 106 may attach to a mounting device for mounting the latching assembly 100 to a towing vehicle. As is known in the art, the head portion 106 may pivot, slide, and/or have an adjustable height with respect to the mounting device to provide for movement of the towed item with respect to the towing vehicle, as well as adjustment of the position of the latching assembly 100 with respect to a kingpin. It is anticipated that the fifth wheel latching assembly 100 will often be used with a head portion 106 and mounting device; however, it will be appreciated by one skilled in the art that other methods of attachment to a towing vehicle and towed item may be used.

As seen in FIG. 1, the latching assembly 100 further includes a handle 108. As will be discussed in further detail hereinbelow, the handle may be actuated to move the latching assembly from a locked alignment to an open alignment. Connected to the hitch body is a safety lock pin 110 and cable 112, which locks the handle 108 and latch bar 118 in the locked position. Also seen in FIG. 1 are the first jaw member 114, second jaw member 116, latch element 118, first pivot pin 130, and second pivot pin 132, which will all be discussed in further detail hereinbelow.

Figure 2:
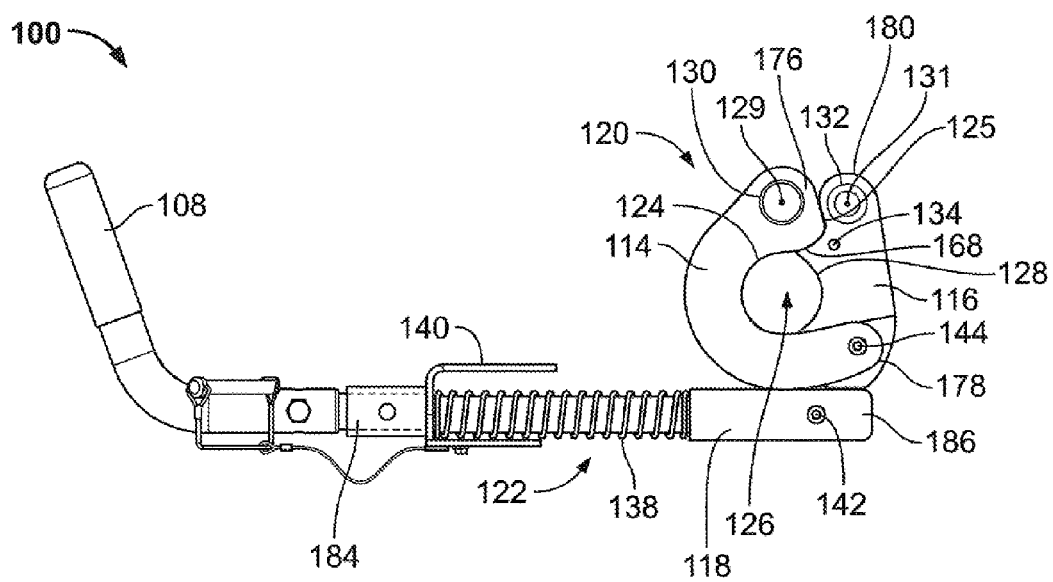
FIG. 2 is a top plan view of the fifth wheel latching assembly of FIG. 1 in its locked alignment.

Turning to FIG. 2, a top plan view of the latching assembly 100 in the locked alignment without a kingpin and displaying the detail of the first locking assembly 120 and second locking assembly 122 is shown. The first locking assembly 120 includes the first jaw member 114 and second jaw member 116. The first jaw member 114 is generally arcuate in shape and includes a first end 176 and a second end 178. Between the first end 176 and second end 178 is a concave surface 124 forming an inlet 126. The inlet is configured to receive and lock a kingpin in place for towing. The first jaw member 114 rotates or pivots about a first pivot axis 129. A first pivot pin 130, located at the first pivot axis 129 near the front or first end 176 of the first jaw member 114 connects the first jaw member 114 to the guide plate 102 and/or head portion 106. Moreover, the first pivot pin 130 allows the first jaw member 114 to rotate between open (shown in FIGS. 5-7) and locked (shown in FIGS. 2-4, 9-10) configurations, as will be discussed in further detail below. As will be appreciated by one skilled in the art, other mechanisms to attach the first jaw member 114 to the guide plate 102 and head portion 106 may be used. Moreover, other mechanisms may be used to allow for rotation of the first jaw member 114, which may be the same or a different mechanism as that attaching the first jaw member 114 to the guide plate 102 and head portion 106.

Figure 5:
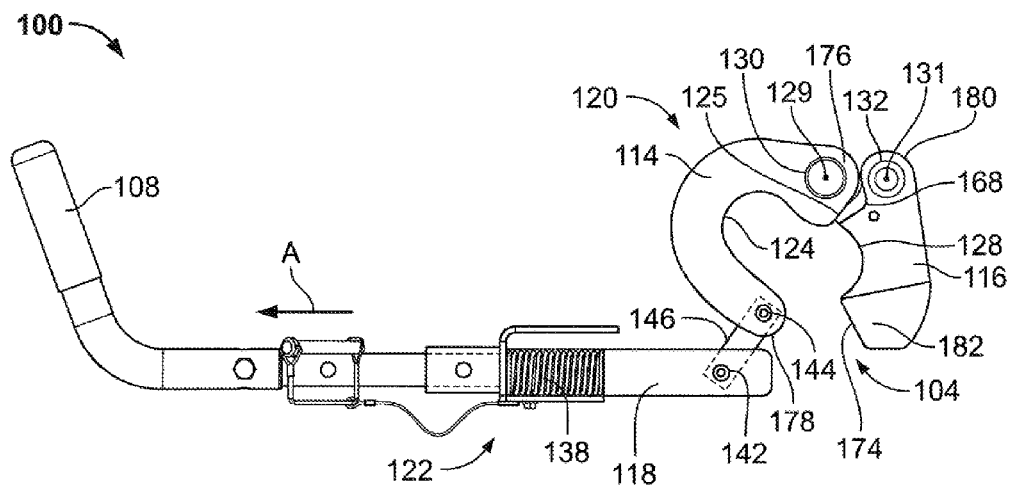
FIG. 5 is a top plan view of the fifth wheel latching assembly of FIG. 1 in its open alignment.
Figure 6:
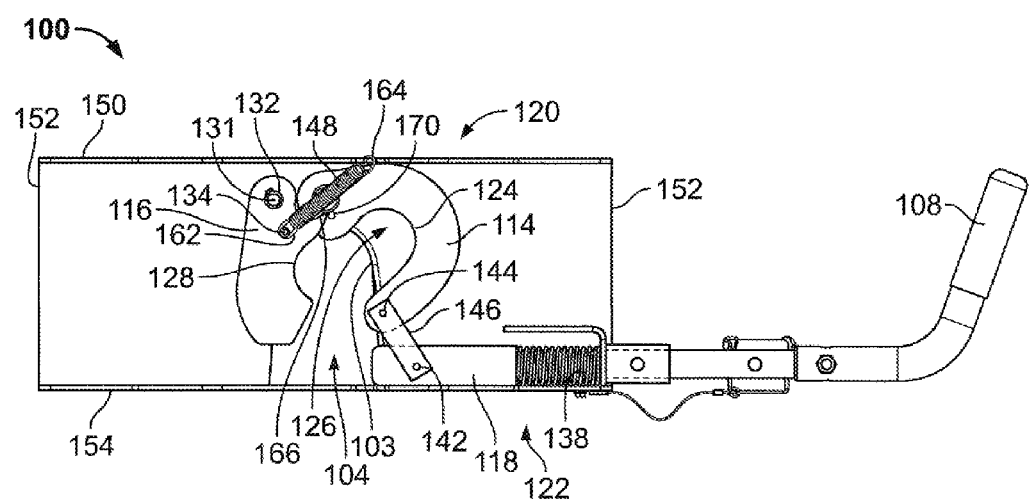
FIG. 6 is a bottom plan view of the fifth wheel latching assembly of FIG. 1 in its open alignment.
Figure 7:
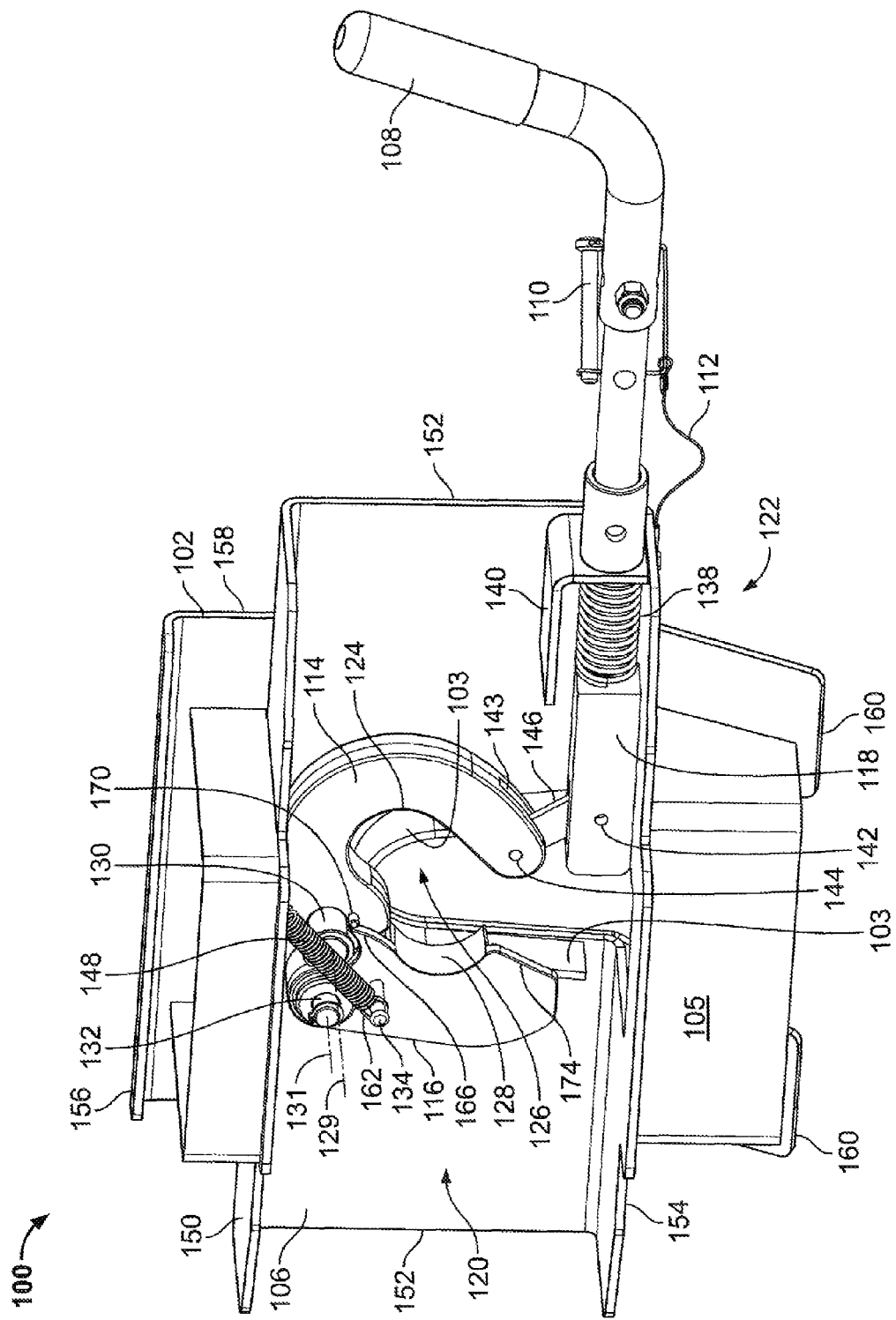
FIG. 7 is a perspective view of the fifth wheel latching assembly of FIG. 1 in its open alignment.

At the back or second end 178 of the first jaw member 114 is a jaw member link pin 144. As best seen in FIGS. 5-7, the jaw member link pin 144 connects the first jaw member 114 to a link 146. It will be understood that any means known in the art now or in the future may be used to connect the first jaw member 114 to the link 146. The illustrated link is an elongated piece of steel; however, it is anticipated that the link 146 may take many forms known in the art now or in the future. As will be discussed below, the link 146 connects the first jaw member 114 to the latch bar 118. However, as will be appreciated by one of skill in the art, direct attachment of the first jaw member 114 and latch bar 118 may be employed. Connection of the first jaw member 114 and latch bar 118, whether direct, through a link 146, or otherwise, provides at least some operational engagement between the first locking assembly 120 and second locking assembly 122, as will be discussed in further detail hereinbelow.

Figure 3:
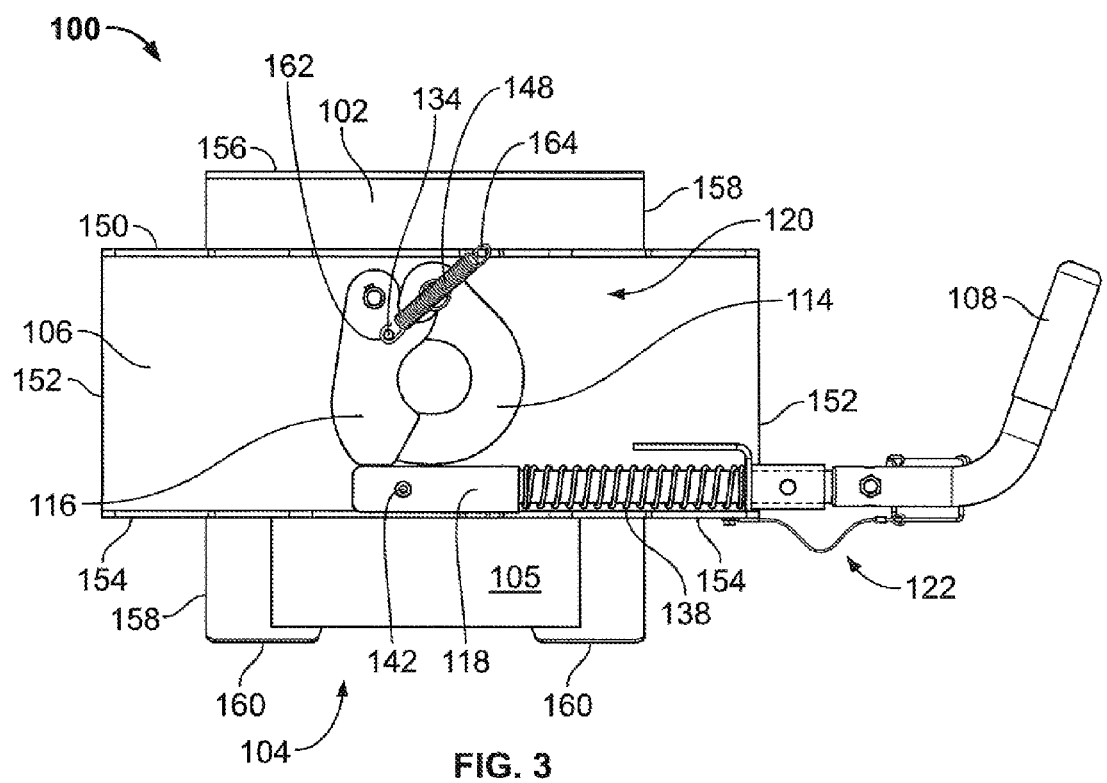
FIG. 3 is a bottom plan view of the fifth wheel latching assembly of FIG. 1 in its locked alignment.

Returning to FIG. 2, the second jaw member having a first end 180 and second end 182 (shown in FIGS. 3-4) includes a concave surface 128 between the ends 180 and 182 (best shown in FIG. 5) to accommodate a kingpin. The second jaw member 116 rotates or pivots about a second pivot axis 131. In addition, a second pivot pin 132 is located at the second pivot axis 131 near the front or first end 180 of the second jaw member 116 and connects same to the guide plate 102 and/or head portion 106 (as shown in FIG. 1). The second jaw member 116 rotates about the second pivot pin 132 to move between open (shown in FIGS. 5-7) and locked (shown in FIGS. 2-4, 9-10) configurations. As will be appreciated by one skilled in the art, other mechanisms to attach the second jaw member 116 to the guide plate 102 and head portion 106 may be used. Moreover, other mechanisms may be used to allow for rotation of the second jaw member 116, which may be the same or a different mechanism as that attaching the second jaw member 116 to the guide plate 102 and head portion 106. A second jaw member pin 134 is located near the front or first end 180 of the second jaw member 116. As can be seen in FIG. 3 and will be discussed further below, the second jaw member pin 134 connects to a first biasing member or second jaw member biasing member 148, which in the preferred embodiment is a spring. Also shown in FIG. 2 is a first jaw member engagement portion 125, which is adjacent to an abutting surface 168 of said second jaw member 116.

The second locking assembly 122 includes the latch element or latch bar 118 having a first end 184 and a second end 186. Also included is a second biasing member or latch bar biasing member 138. The latch bar 118 is movable between open (shown in FIGS. 5-7) and locked (shown in FIGS. 2-4, 9-10) positions. In the locked position shown in FIG. 2, the latch bar 118 extends across the throat area 104. In the preferred embodiment, the latch bar biasing member 138 is a spring, however, it is anticipated that other methods of biasing the latch bar 118 may be used. The latch bar biasing member 138 biases the latch bar 118 in the locked position shown in FIG. 2. A handle slide steel mount 140 helps guide the handle 108 when pulled. Also shown is the handle 108, which is connected to the latch bar 118 first end 184. Near the second end 186 of the latch bar 118 is a latch bar link pin 142. As is best seen in FIGS. 5-7, the latch bar link pin 142 connects the latch bar to the link 146. It is anticipated that any means known in the art now or in the future may be used to connect the latch bar to the link 146.

FIG. 3 provides a bottom plan view of the latching assembly 100 in the locked alignment. The first locking assembly 120, including the first jaw member 114 and second jaw member 116, is shown. Also shown are the handle 108, jaw latch bar 118, and latch bar biasing member 138. The head portion 106 is shown having a front edge 150, two side edges 152, and a back edge 154, from which the throat area 104 is a cut. Similarly, the guide plate 102 includes a front edge 156, two side edges 158, and a back edge 160. The throat area 104 is cut away from the guide plate 102 back edge 160. The throat floor 105 is also shown. The second jaw member biasing member 148 includes a first attachment end 162 and a second attachment end 164. The first attachment end 162 is connected to the second jaw member pin 134. The second attachment end is connected to the head portion 106 front edge 150. The second jaw member biasing member 148 biases the second jaw member 116 in the locked configuration shown in FIG. 3. It will be understood that other biasing means may be used to bias the second jaw member 116 in the locked configuration. Further, it will be understood that any means known in the art now or in the future may be used to attach the second jaw member biasing member 148 to the second jaw member 116 and head portion 106 front edge 150. In addition, it is anticipated that in some embodiments the second jaw member biasing member 148 may attach at its second attachment end 164 to other components of the latching assembly 100. It is further anticipated that other embodiments may be employed to bias the first locking assembly 120 in the locked position. For example, the first jaw member 114 may be biased in the locked position rather than or in addition to the second jaw member 116.

Figure 4:
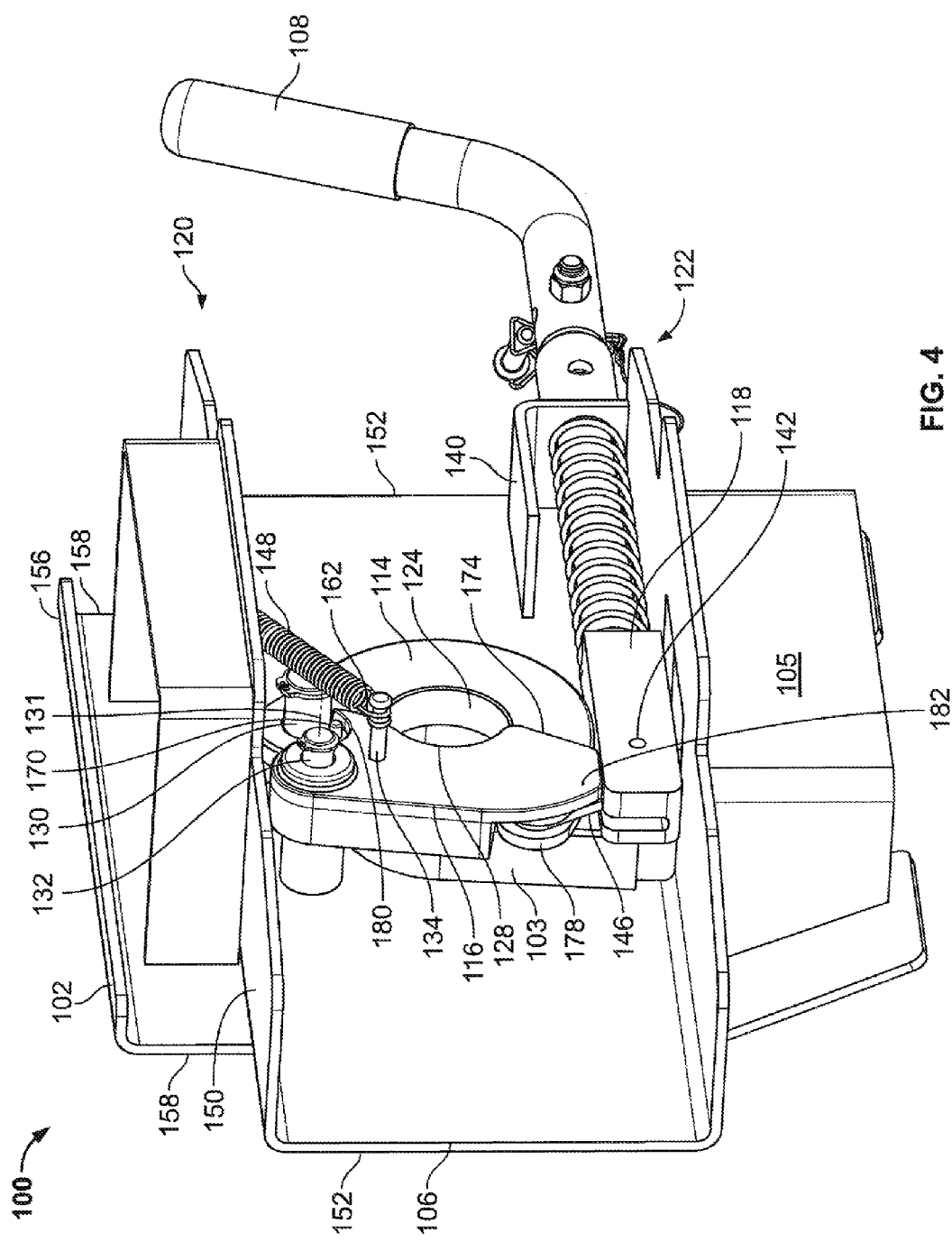
FIG. 4 is a perspective view of the fifth wheel latching assembly of FIG. 1 in its locked alignment.

FIG. 4 provides a perspective view of the latching assembly 100 from below in its locked configuration. The guide plate 102 and head portion 106 are shown, as is the underside of the throat floor 105. A skirt portion 103 extends below the guide plate 102 and is located above the first 114 and second 116 jaw members. The first jaw member 114 and its concave surface 124 are provided. The second jaw member 116 and its pivot axis 131 are shown in more detail. Extending below the second jaw member 116 is the second jaw member pin 134, to which the second jaw member biasing member 148 is attached at its first attachment end 162. Moreover, both the first 130 and second 132 pivot pins extend below their respective jaw members 114 and 116. The second jaw member 116 first 180 and second 182 ends are shown. In the locked configuration, the first jaw member 114 second end 178 is located above the second jaw member 116 second end 182. Accordingly the first jaw member 114 second end 178 and second jaw member 116 second end 182 overlap in the locked configuration as the first jaw member 114 concave surface 124 at least partially encircles a kingpin. Moreover, as will be discussed in further detail below, the link 146 is attached to the first jaw member 114 second end 178.

FIG. 5 illustrates a top plan view of the latching assembly 100 in its open alignment. The open alignment is achieved by actuating the handle 108 by pulling same in the direction of arrow A. This motion overcomes the bias of the latch bar biasing member 138 to pull the latch bar 118 into its open position, exposing the throat area 104 of the head portion 106. As the latch bar 118 moves to its open position, the latch bar link pin 142 is also pulled away from the throat area 104. Because the latch bar link pin 142 is attached to the link 146, the link is also pulled to an open position. Moreover, as the jaw member link pin 144 further connects the link 146 to the first jaw member 114, the first jaw member 114 is pulled to its open configuration. Accordingly, the first locking assembly 120 and second locking assembly 122 are in at least partial operational engagement to move to their open configurations. Specifically, movement of the latch bar 118 into the open position actuates the first locking assembly 120 to move to the open configuration. Particularly, the first jaw member 114 is actuated to move to its open configuration. The pulling of the first jaw member 114 by the link 146 causes the first jaw member 114 to rotate about the first pivot pin 130. In its closed position, the first jaw member 114 engagement portion 125 is adjacent to the abutting surface 168 of the second jaw member 116. The rotation of the first jaw member 114 moves the first jaw member away from the second jaw member 116 abutting surface 168. Moreover, as the first jaw member 114 moves away from the second jaw member 116 abutting surface 168, the first jaw member 114 engagement portion 125 cams against the abutting surface 168 and pushes the second jaw member 116 such that it rotates about the second pivot pin 132 into its open configuration.

FIGS. 6 and 7 provide detail of the latching assembly 100 in its open alignment from underneath the assembly 100. Rotation of the second jaw member 116 about the second pivot axis 131 via the second pivot pin 132 allows a second jaw member 116 catching portion 166 to engage a first jaw member catch 170. Engagement of the catch 170 by the catching portion 166 holds the latching assembly 100, including the first locking assembly 120 and second locking assembly 122, in its open alignment. Accordingly, the engagement of the catching portion 166 and catch 170 is strong enough to overcome the bias of the latch bar biasing member 138 and second jaw member biasing member 148. As seen in FIG. 7, the second jaw member 116 catching portion 166 wedges between the catch 170 and the first pivot pin 130 to remain in the open configuration. The second jaw member 116 catching portion 166 (best shown in FIG. 7) and abutting surface 168 (best shown in FIG. 5) are located in different planes. The abutting surface 168 is located above the catching portion 166. In other words, the abutting surface 168 is cut away from the top of the second jaw member 116 to engage the first jaw member 114 in the locked configuration. The catching portion 166 is located below the first jaw member 114 (best shown in FIG. 7). It is anticipated, however, that any means known in the art now or in the future may be used to catch or hold the first jaw member 114 and second jaw member 116 in their open configurations. For example, it is anticipated that the arrangement could be reversed, with a catch on the second jaw member 116 and catching portion on the first jaw member 114. Moreover, other types of selectively engageable fasteners may be employed. It is also anticipated that in some embodiments the first jaw member 114 and second jaw member 116 will not overlap as discussed above.

Returning to FIGS. 6 and 7, the catching portion 166 engages the first jaw member catch 170 to hold both the first jaw member 114 and second jaw member 116 in their open configurations. Moreover, as the first jaw member 114 is held in the open position, the link 146 is held in its open position via the jaw member link pin 144. As shown in FIG. 7, the link is connected to the first jaw member 114 link pin 144 and extends into a first jaw member 114 link recess 143. In addition, the latch bar 118 is also held in its open position due to the latch bar link pin 142 connecting the latch bar 118 and link 146. Accordingly, actuation of the handle causes both the first 120 and second 122 locking assemblies to move into their open configuration and actuation of the handle moves the entire latching assembly 100 to the open alignment.

Figure 8:
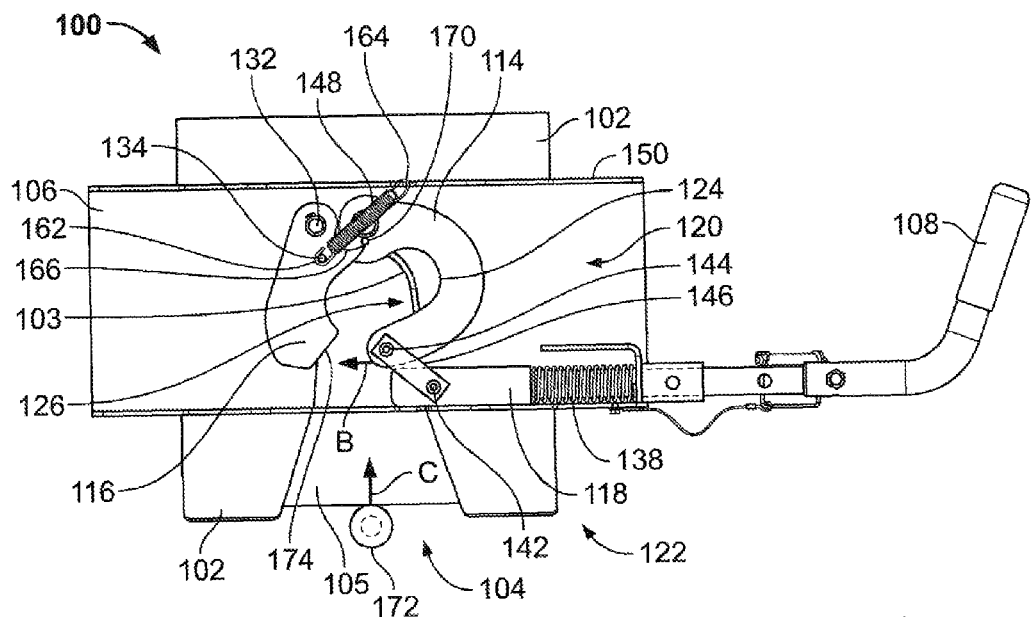
FIG. 8 is a bottom plan view of the fifth wheel latching assembly of FIG. 1 in its open alignment as it receives a kingpin.

Once in the open alignment, the latching assembly 100 is able to receive a kingpin 172. FIG. 8 illustrates a bottom plan view of the latching assembly 100 as a kingpin 172 is inserted into the assembly 100, such as when a driver backs the towing vehicle to the towed item to which the kingpin 172 is attached. The kingpin 172 moves into the throat area 172 in the direction of arrow C. The throat floor 105 and guide plate 102 guide the kingpin 172 into position with respect to the latching assembly 100. As the kingpin 172 moves through the throat area 104, it pushes or bears on an angled portion 174 of the second jaw member 116. This causes the second jaw member 116 to rotate about the second pivot pin 132 and causes the catching portion 166 to release or disengage the first jaw member catch 170. At the same time, the second jaw member biasing member 148 which is biased to retain the second jaw member 116 in its locked configuration, pulls the second jaw member 116 to its locked configuration (seen in FIGS. 9-10). As discussed above, the second jaw member biasing member 148 is connected at its first attachment end 162 to the second jaw member 116 and at its second attachment end 164 to the head portion 106 front edge 150.

In its open configuration, the first jaw member 114 is held open by engagement of the second jaw member 116 catching portion 166 and first jaw member catch 170. As the second jaw member 116 rotates about the second pivot pin 132 to its closed configuration and releases the catch 170, the second jaw member 116 abutting surface 168 cams against the first jaw member engagement portion 125 and pushes the first jaw member 114 into its locked configuration (see FIGS. 2 and 5). In addition, at the same time, the latch bar biasing member 138 also causes the first jaw member 114 to move to its locked configuration, which will be discussed in further detail below. Throughout this movement, the first jaw member 114 rotates about the first pivot pin 130. The movement of the first jaw member 114 is shown by arrow B in FIG. 8. As discussed above, the first jaw member 114 is connected to the link 146 via the jaw member link pin 144. Accordingly, as the first jaw member 114 rotates to its locked configuration, it pulls the link 146 with it. As the link 146 is connected to the latch bar 118 via the latch bar link pin 142, the latch bar is also moved to its locked position.

It will be understood that in the preferred embodiment, that engagement of the second jaw member 116 catching portion 166 and first jaw member catch 170 overcomes the force of the latch bar biasing member 138 to hold the second locking assembly 122 open via the link 146 connecting the two locking assemblies 120 and 122. Once the second jaw member 116 catching portion 166 releases the first jaw member catch 170, the movement of the second jaw member 116, first jaw member 114, and the link 146, as well as the force of the latch bar biasing member 138 work simultaneously to move the latch bar 118 into its locked position. Moreover, the force of the latch bar biasing member 138 also aids in moving the first jaw member 114 into its locked position, as the latch bar 118 will pull the link 146 and first jaw member 114 to the closed position. Accordingly, insertion of the kingpin 172 automatically moves or actuates the entire latching assembly 100, including the first locking assembly 120 and second locking assembly 122, including the latch bar 118, into the locked alignment.

Figure 9:
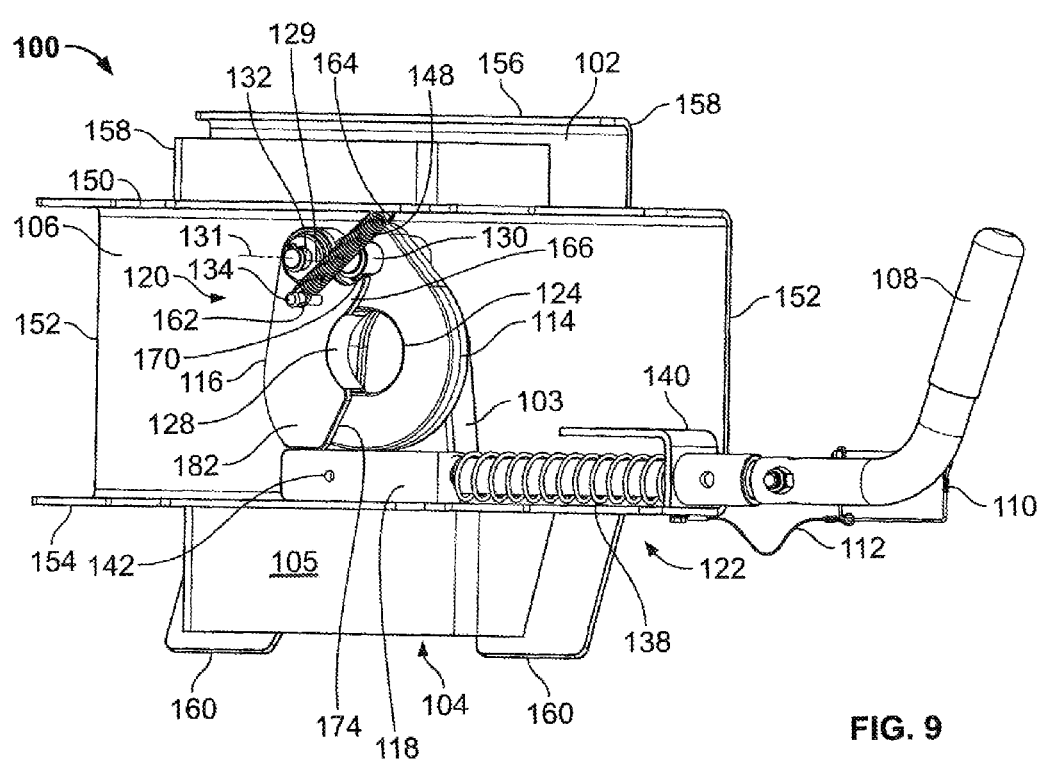
FIG. 9 is a perspective view of the fifth wheel latching assembly of FIG. 1 in its locked alignment.

FIG. 9 shows the latching assembly 100 in its locked alignment. The latch bar 118 is biased in its locked position across the throat 104 by the latch bar biasing member 138. The first jaw member 114 is also in its locked configuration across the throat 104, held in place by both the latch bar 118 and second jaw member 116. The second jaw member is held in place by the second jaw member 116 biasing member 148. In their locked configurations, the first jaw member 114 second end 178 overlaps with and is located above the second jaw member 116 second end 182. The second jaw member 116 catching portion 166 does not engage the first jaw member catch 170. Moreover, the first jaw member 114 concave surface 124 aligns with the second jaw member 116 concave surface 128 to encircle a kingpin 172.

Figure 10:
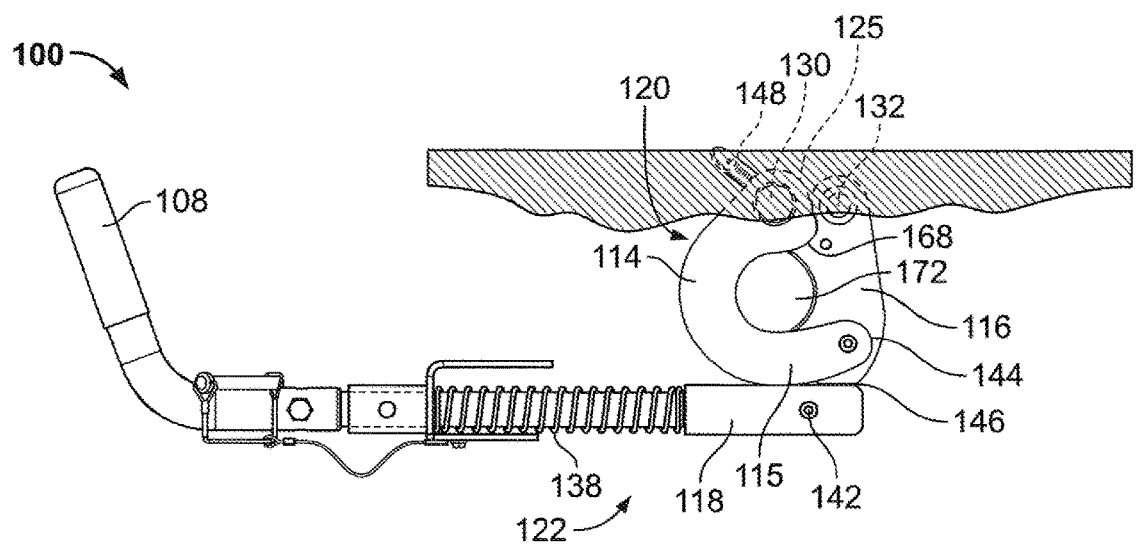
FIG. 10 is a top plan view of the fifth wheel latching assembly of FIG. 1 in its locked alignment with a kingpin in place.

A kingpin 172 will be securely locked in the latching assembly 100 by both the first locking assembly 120 and second locking assembly 122. Referring to FIG. 10, the first locking assembly 120 includes the first jaw member 114 and second jaw member 116. Specifically, the first jaw member 114 wraps around and at least partially encircles the kingpin 172. Therefore, a locking portion 115 of the first jaw member 114 provides a barrier to decoupling of the kingpin 172. In alternate embodiments of the invention, the second jaw member 116 may be configured to wrap around the kingpin 172. The second locking assembly 122 includes the latch bar 118 and latch bar biasing member 138. The latch bar 118 also provides a barrier to decoupling of the kingpin 172. Accordingly, if the first locking assembly 120 should fail, such as by separation of the first 114 and second 116 jaw members, the latch bar 118, which is biased in its locked position by the latch bar biasing member 138, will prevent decoupling of the kingpin 172 until the handle 108 is actuated by a user. Moreover, in latch bar-only designs, it has been found that the latch bar may be susceptible to wear by the kingpin 172. The design of the present invention prevents same. In addition, should the latch bar 118 fail, the first jaw member 114 will continue to lock the kingpin 172 in place by at least partially encircling the kingpin 172, while at the same time being held in its locked configuration by the second jaw member 116 and second jaw member biasing member 148, thereby preventing decoupling of the towing vehicle and towed item. Accordingly, if the latch bar 118 fails, the first jaw member 114 will remain in the locked configuration until actuation of the handle 108.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. A fifth wheel latching assembly comprising:
    a first locking assembly having open and locked configurations comprising:
        a first jaw member;
        a second jaw member;
        a first biasing member biasing at least one of said first and second jaw members in said locked configuration;
        wherein in said locked configuration at least one of said first and second jaw members locks a kingpin in place;
    a second locking assembly comprising a latch element and a latch element biasing member, said latch element biasing member biasing said latch element in a locked position to lock said kingpin in place;
    said first and second locking assemblies in operational engagement such that actuation of said latch element to an open position actuates said first locking assembly to move to said open configuration; and
    said first and second locking assemblies independently lock said kingpin in place.

2. The assembly of claim 1 wherein insertion of said kingpin causes automatic movement of said first locking assembly to said locked configuration and said latch element to said locked position.

3. The assembly of claim 2 wherein said first jaw member comprises a concave surface forming an inlet, said inlet configured to at least partially encircle said kingpin to lock said kingpin in place.

4. The assembly of claim 3 wherein said first jaw member rotates about a first pivot axis to move between first locking assembly open and locked configurations.

5. The assembly of claim 1 wherein said second jaw member comprises:
    an angled portion; and
    an abutting surface.

6. The assembly of claim 5 wherein said abutting surface is adjacent to an engagement portion of said first jaw member in said first assembly locked configuration.

7. The assembly of claim 6 wherein said first jaw member engagement portion and said second jaw member abutting surface cam against each other to move said first and second jaw members between said open and locked configurations.

8. The assembly of claim 7 wherein said second jaw member rotates about a second pivot axis to move between first locking assembly open and locked configurations.

9. The assembly of claim 1 further comprising a link between said first and second locking assemblies.

10. A fifth wheel latching assembly comprising:
a first locking assembly comprising:
a first jaw member having a concave surface, said concave surface forming an inlet;
said inlet configured to at least partially encircle a kingpin;
a second jaw member;
said first and second jaw members movable between open and locked configurations;
said first jaw member locking said kingpin in said inlet in said locked position;
a first biasing member biasing said second jaw member in said open configuration;
a second locking assembly comprising:
a latch element movable between open and locked positions;
a second biasing member biasing said latch element in said locked position;
a link connecting said latch element and said first locking assembly;
wherein actuation of said latch element to said open position actuates said link to move said first locking assembly to said open configuration; and
wherein insertion of said kingpin actuates said first locking assembly to move to said locked configuration and said latch element to move to said locked position.

11. The assembly of claim 10 wherein said first biasing member is a spring having a first attachment end and a second attachment end, said first attachment end is attached to said second jaw member and said second attachment end is attached to a latching assembly head portion.

12. The assembly of claim 11 wherein said second jaw member further comprises an abutting surface, said abutting surface adjacent to an engagement portion of said first jaw member in said first and second jaw member locked configurations and said first jaw member engagement portion and said second jaw member abutting surface camming against each other to move said first and second jaw member between said open and locked configurations.

13. The assembly of claim 12 wherein said first jaw member rotates about a first pivot axis and said second jaw member rotates about a second pivot axis.

14. The assembly of claim 13 wherein said first jaw member further comprises a jaw member link pin, said latch element further comprises a latch element link pin, said jaw member link pin is attached to a first portion of said link, and said latch element pin is attached to a second portion of said link.

15. A fifth Wheel latching assembly comprising:
an arcuate first jaw member movable between a first jaw member locked configuration and a first jaw member open configuration comprising:
a first end;
an engagement portion near said first end;
a second end;
a concave surface between said first end and said second end forming an inlet;
a first jaw member link pin near said second end;
a catch near said first end;
said first jaw member rotatable about a first pivot pin;
a second jaw member movable between a second jaw member locked configuration and a second jaw member open configuration comprising:
a first end;
a second end;
a catching portion near said first end;
an abutting surface near said first end;
an angled portion near said second end;
said second jaw member rotatable about a second pivot pin;
a first biasing member biasing said second jaw member in said second jaw member locked configuration;
a latch bar movable between an open position and a locked position comprising:
a first end;
a second end;
a handle connected to said first end;
a latch bar link pin near said second end;
a second biasing member biasing said latch bar in said locked position;
a link connecting said latch bar and said first jaw member, said link attached to said first jaw member link pin at a first end and said latch bar link pin at a second end;
wherein actuation of said handle moves said latch bar to said open position, which actuates said link to move said first jaw member to said first jaw member open configuration, which actuates said first jaw member engagement portion to cam against said second jaw member abutting surface, which causes said second jaw member catching portion to engage said first jaw member catch;
said engagement of said first jaw member catch by said second jaw member catching portion holding said first and second jaw members in said open configurations and said latch bar in Said open position; and
wherein insertion of a kingpin causes said kingpin to bear against said angled portion of said second jaw member, which causes said second jaw member catching portion to release said first jaw member catch, which actuates said first jaw member to move to said first jaw member locked configuration wherein said kingpin is received in said inlet and said latch bar to move to said locked position.

16. A fifth wheel latching assembly comprising:
a first locking assembly comprising:
a first jaw member having a concave surface, said concave surface forming an inlet;
said inlet configured to at least partially encircle a kingpin;
a second jaw member;
said first and second jaw members movable between open and locked configurations;
said first jaw member locking said kingpin in said inlet in said locked configuration;
a first biasing member biasing said second jaw member in said locked configuration;
a second locking assembly comprising:
a latch element movable between open and locked positions;
a second biasing member biasing said latch element in said locked position;
a link connecting said first and second locking assemblies;

wherein actuation of said latch element to said open position actuates said link to move said first locking assembly to said open configuration;

wherein insertion of said kingpin actuates said first locking assembly to move to said locked configuration and said latch element to move to said locked position; and wherein said first and second locking assemblies are in operational engagement such that said first and second biasing members bias said first jaw member in said locked configuration.

17. The assembly of claim 16 wherein said first biasing member is a spring having a first attachment end and a second attachment end, said first attachment end is attached to said second jaw member and said second attachment end is attached to a latching assembly head portion.

18. The assembly of claim 17 wherein said second jaw member further comprises an abutting surface, said abutting surface adjacent to an engagement portion of said first jaw member in said first and second jaw member locked configurations and said first jaw member engagement portion and said second jaw member abutting surface camming against each other to move said first and second jaw member between said open and locked configurations.

19. The assembly of claim 18 wherein said first jaw member further comprises a jaw member link pin, said latch element further comprises a latch element link pin, said jaw member link pin is attached to a first portion of said link, and said latch element pin is attached to a second portion of said link.

* * * * *